Feb. 6, 1962  F. G. EUBANKS  3,020,364
TIMED ELECTRICAL CONTROL APPARATUS
Original Filed Sept. 8, 1953  6 Sheets-Sheet 1
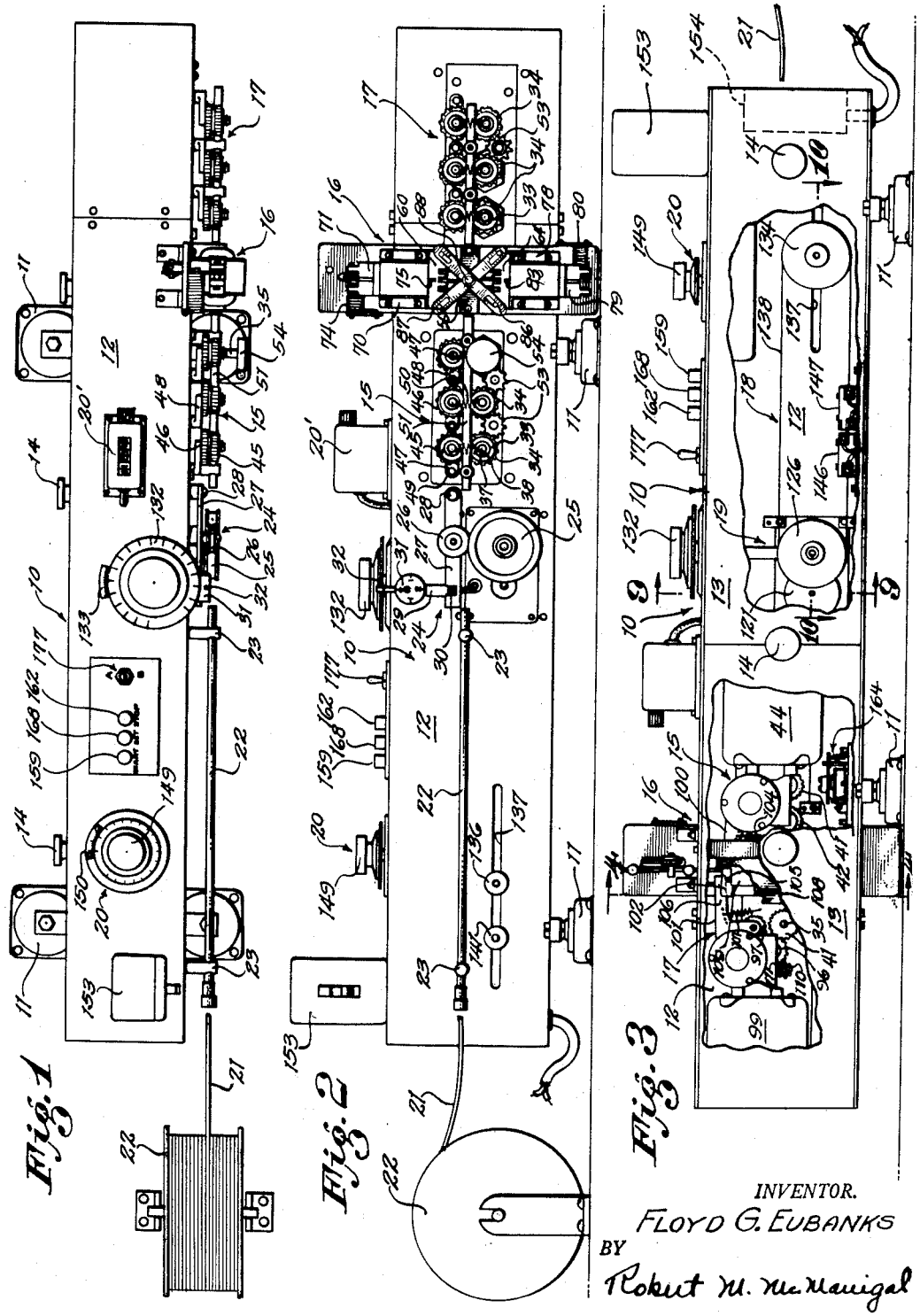
INVENTOR.
FLOYD G. EUBANKS
BY Robert M. McManigal
ATTORNEY.

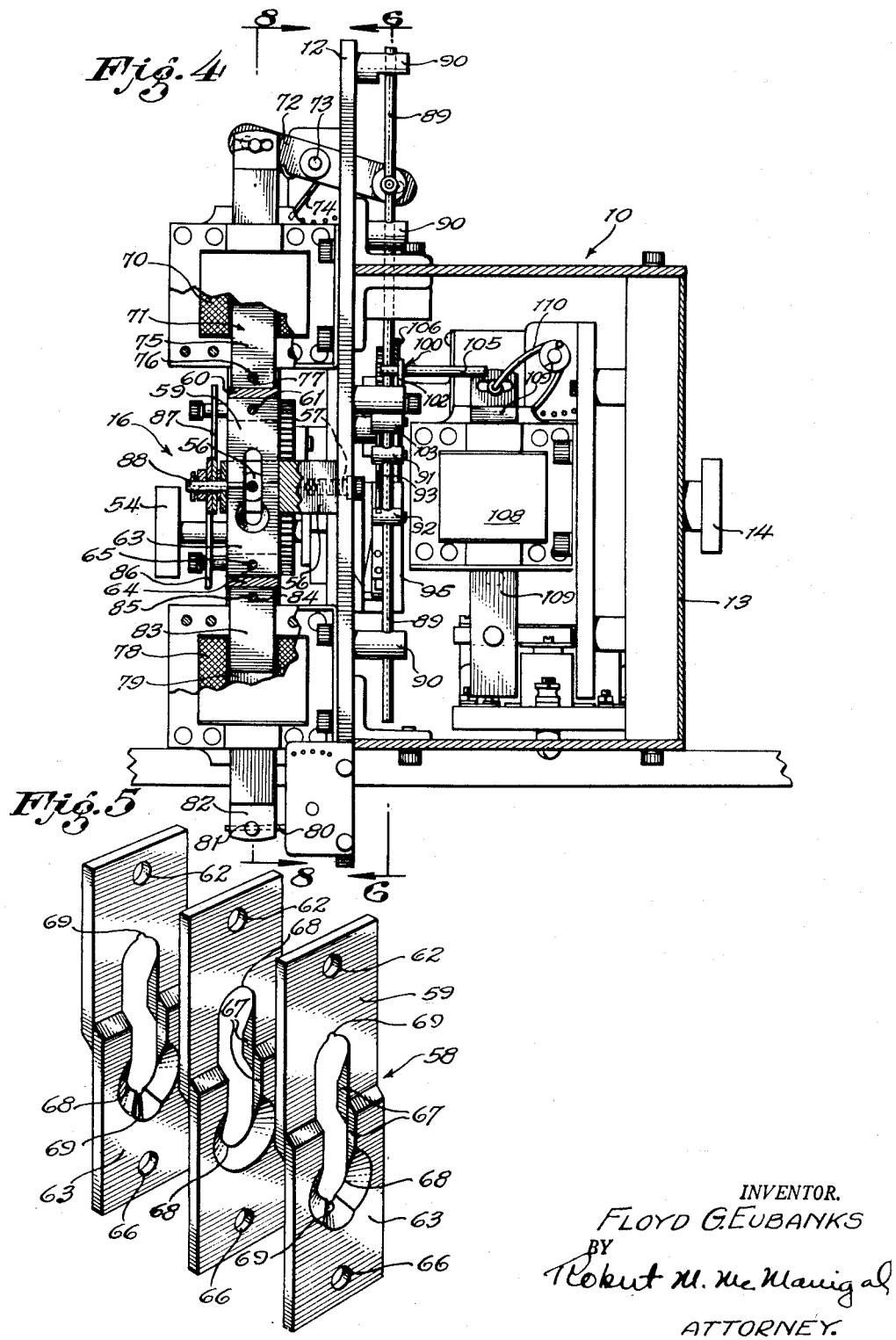

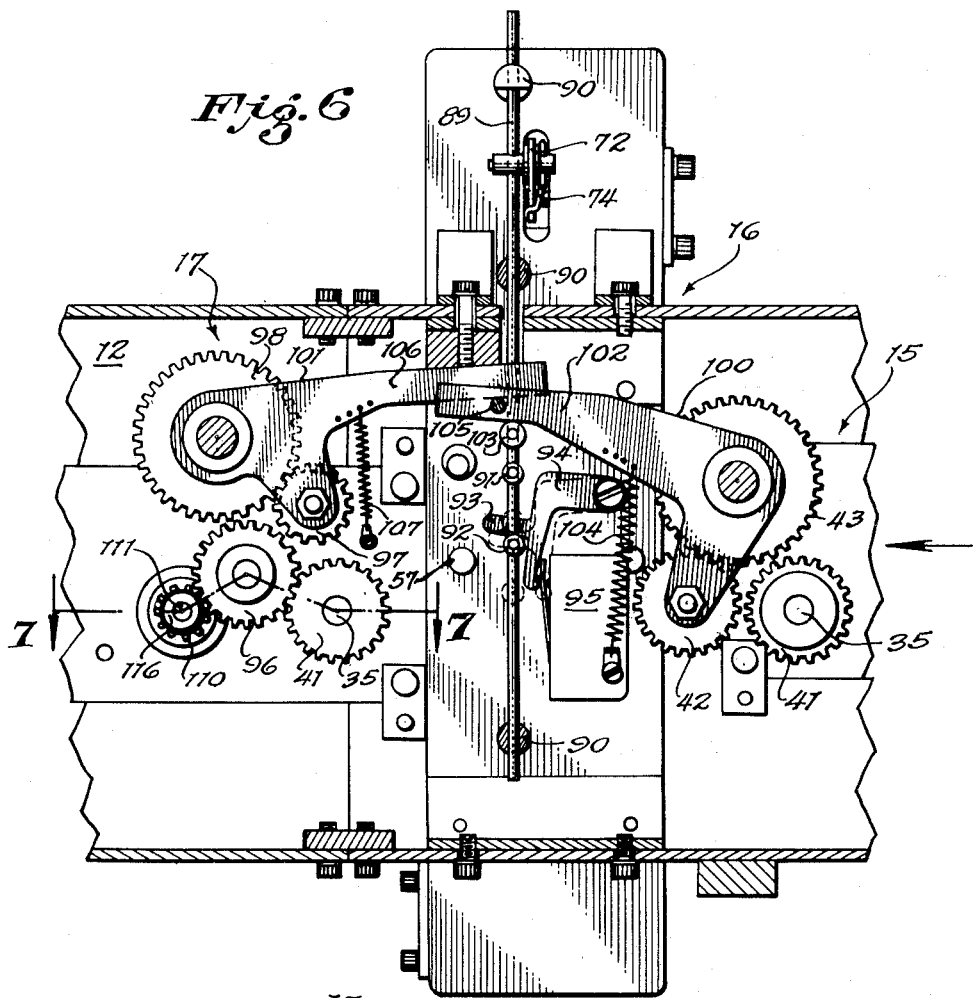
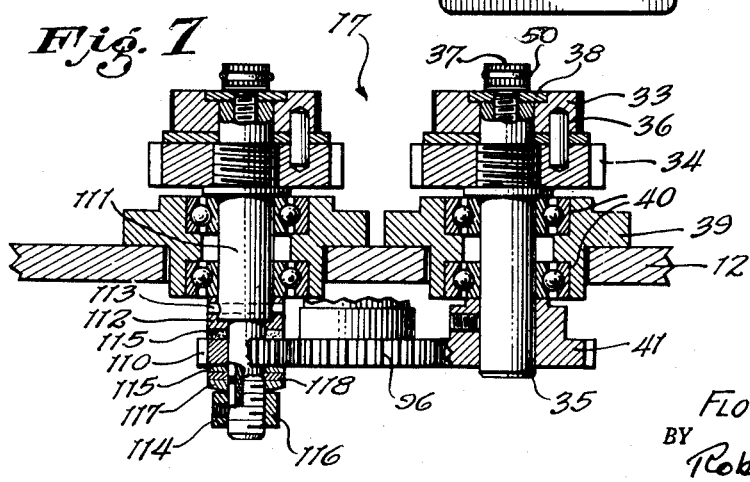

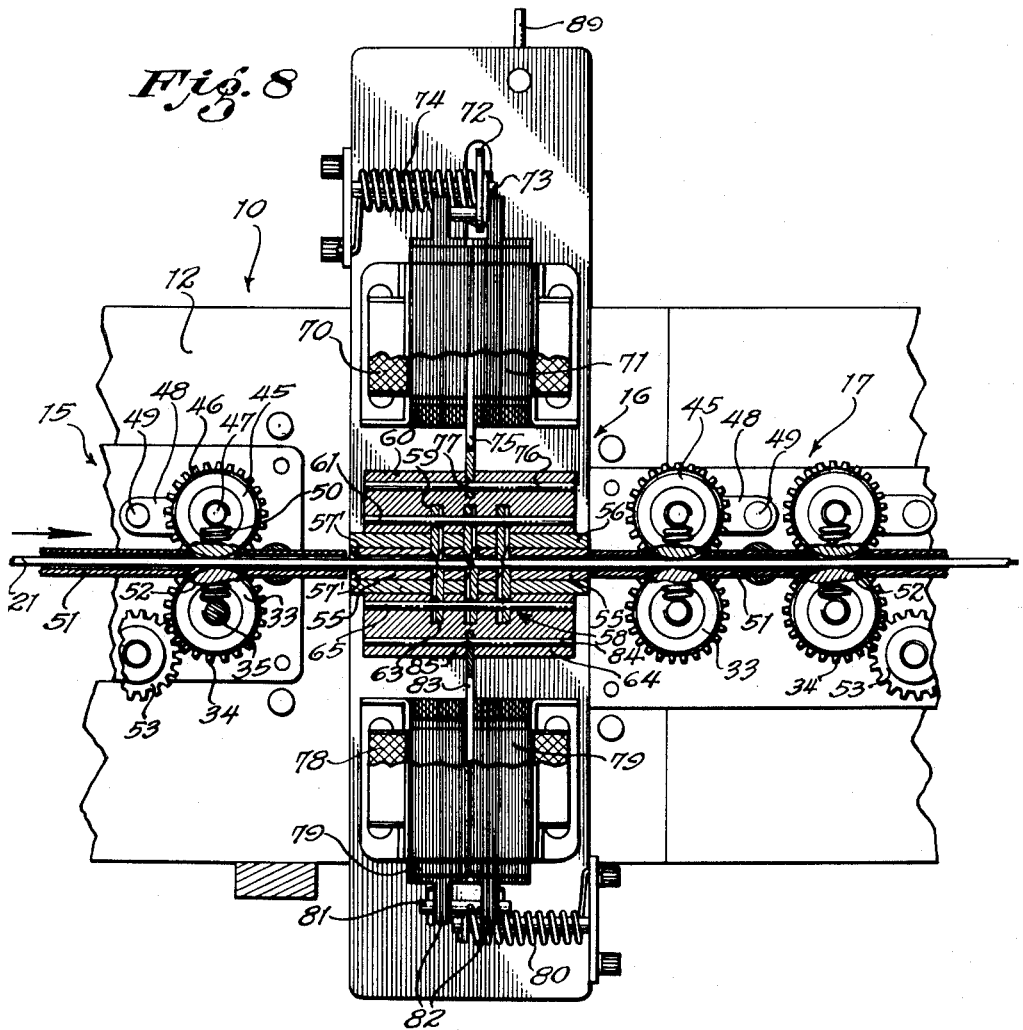

Feb. 6, 1962   F. G. EUBANKS   3,020,364
TIMED ELECTRICAL CONTROL APPARATUS
Original Filed Sept. 8, 1953   6 Sheets-Sheet 5
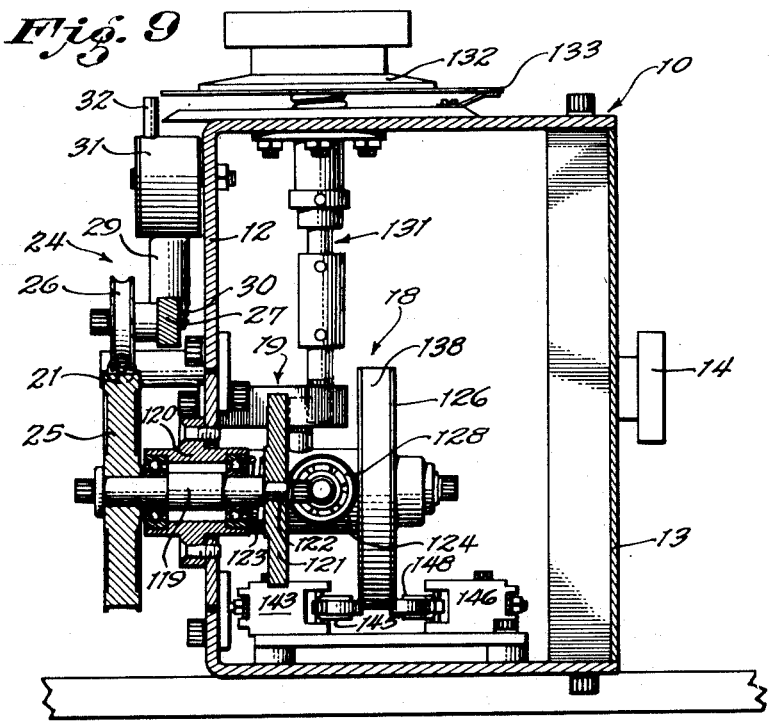
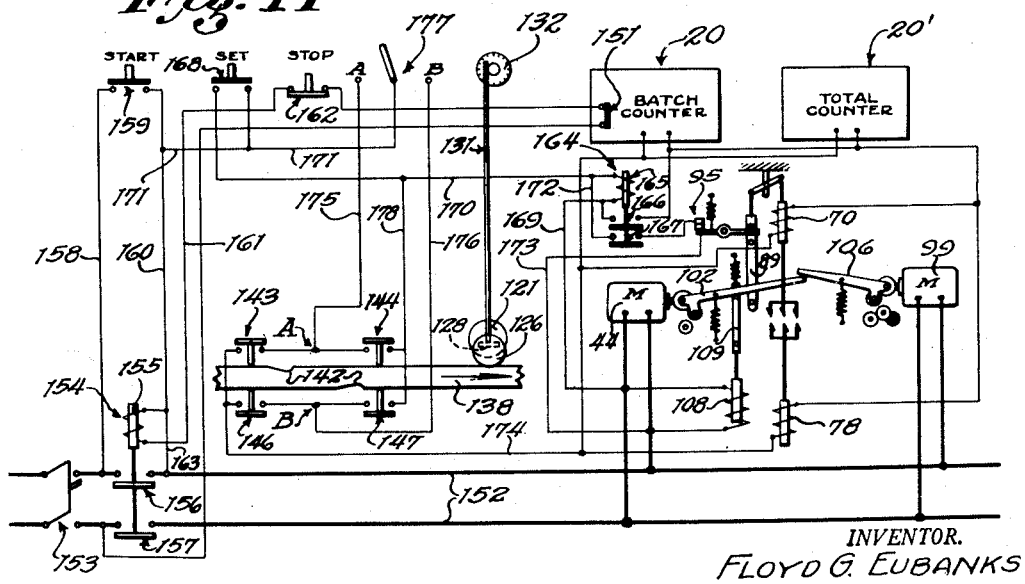
INVENTOR.
FLOYD G. EUBANKS
BY Robert M. McManigal
ATTORNEY.

INVENTOR.
FLOYD G. EUBANKS
BY Robert M. McManigal
ATTORNEY.

United States Patent Office 3,020,364
Patented Feb. 6, 1962

3,020,364
TIMED ELECTRICAL CONTROL APPARATUS
Floyd G. Eubanks, 2665 Las Lunas St., Pasadena, Calif., assignor of ten percent to Robert M. McManigol, South Pasadena, Calif.
Original application Sept. 8, 1953, Ser. No. 378,732, now Patent No. 2,811,063, dated Oct. 29, 1957. Divided and this application Aug. 26, 1957, Ser. No. 680,096
2 Claims. (Cl. 200—46)

The present invention relates generally to control apparatus, and is more particularly concerned with control apparatus for variably controlling one or more electrical circuits in predetermined timed relation.

This application constitutes a division of my copending application, Serial No. 378,732, filed September 8, 1953, now issued as U.S. Patent No. 2,811,063.

It is an object of the present invention to provide a novel switching control device containing unique means for timing the actuation of switch control contacts in relation to the speed of driving means movement, either linear or rotary.

It is to be understood that, while the invention is illustrated in connection with apparatus for severing a filamentary material, the control is susceptible of general application where it may be desired to variably control a circuit in accordance with the linear or rotary travel of a member.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a plan view of apparatus embodying the features of the herein described invention;

FIG. 2 is an elevational view of the same;

FIG. 3 is a rear view, portions of the enclosing housing being cutaway to disclose the physical relationship of certain of the component parts of the apparatus;

FIG. 4 is an enlarged transverse sectional view of the cutter and its actuating mechanism, taken substantially on line 4—4 of FIG. 3;

FIG. 5 is a perspective view showing the details of the cutter knives and their construction;

FIG. 6 is an enlarged fragmentary view in which a section is taken substantially on line 6—6 of FIG. 4 to show details of the mechanism for interrupting material feed during cutting operations;

FIG. 7 is an enlarged fragmentary section taken substantially on line 7—7 of FIG. 6, and showing details of the driving mechanism of the stripper rollers;

FIG. 8 is an enlarged fragmentary view including a vertical section through the cutting mechanism, taken substantially on line 8—8 of FIG. 4, and having cutaway portions to show the association of the feeding rollers with the material;

FIG. 9 is an enlarged transverse sectional view through the apparatus, taken substantially on line 9—9 of FIG. 3, and showing details of the variable speed drive for the master control mechanism;

FIG. 11 is a view schematically illustrating the electrical and mechanical components of the apparatus and their interconnection with the master control.

Figure 10:
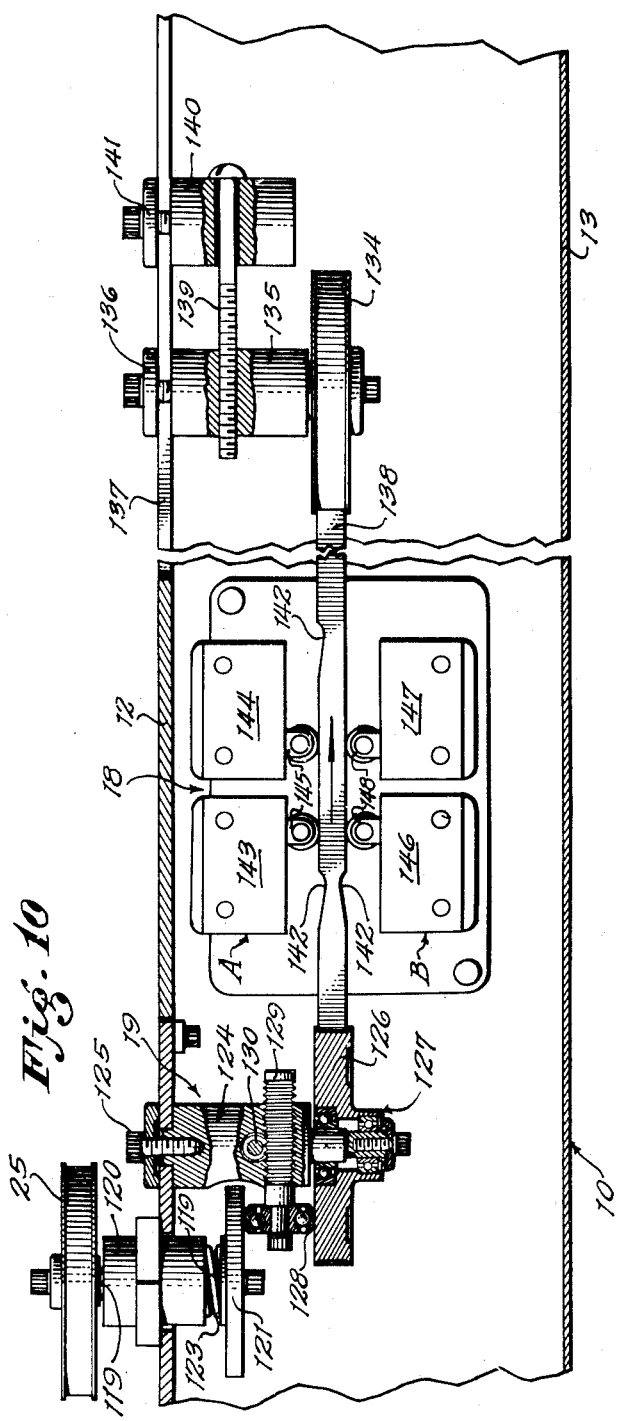
FIG. 10 is an enlarged fragmentary view of the master controller, including a horizontal section taken substantially on line 10—10 of FIG. 3.

As shown generally in FIGS. 1, 2 and 3, the component parts of the cutting and stripping apparatus of the present invention are mounted upon an elongate combined housing and supporting panel 10 fabricated from suitable sheet metal material and mounted on spaced pads or feet 11. These pads are arranged to be anchored to a supporting surface and support the housing in a slightly raised position.

In general, the housing has a front wall 12 which serves as a mounting panel for certain component parts of the apparatus, as will hereinafter be described in detail. In order to provide convenient access to the interior of the housing and certain of the component parts contained therein, the housing may have a back wall structure composed of removable panel sections 13 which are arranged to be retained in assembled relation with the other parts of the housing by means of removable holding thumb screws 14.

In its broad aspect, the apparatus is in the main composed of a number of component assemblies which will subsequently be described in detail. Briefly these assemblies may be referred to as the feeding mechanism 15, a cutting mechanism 16, a stripping mechanism 17, a master tape cycle control 18, length control 19 and batch control 20.

In its broad concept, the apparatus is susceptible of general application for the cutting of different types of filamentary material such as wire, cord, rubber and other filamentary material composed of different substances. However, it is believed that the various component parts will be more clearly understood if described in connection with the cutting and stripping of insulated wire such as commonly employed for electrical wiring purposes.

When utilized for the foregoing purpose, the wire, as generally indicated by the numeral 21, is fed from a rotatably supported reel 22 positioned in a convenient location adjacent the left end of the apparatus as viewed in FIGS. 1 and 2.

The feeding mechanism

The wire 21 is guided to the feeding mechanism by passing it through an elongate tube 22 supported on the front wall 12 of the housing by means of spaced brackets 23—23. Upon leaving the tube 22, the wire passes through a pressure applying device 24 to the feeding mechanism which operates to feed the wire to the cutting mechanism 16.

The pressure applying device is adjustable so that pressure may be placed against the wire prior to its entering the feeding mechanism to press it against a measuring wheel 25 by an associated wheel 26 between which the wire is fed. The wheel 26 is rotatably supported on an arm 27 which is pivotally mounted at one end on a pivot 28 for swinging movement. At its outermost end, the arm 27 carries a reciprocably mounted pin 29 which is supported resiliently by a coil spring 30 in such a manner as to bias the pin in an upward direction against a graduated cam member 31 having an actuating handle 32 which enables rotation of the cam. By adjusting the cam 31, the pin 29 may be moved towards or away from the spring 30 so as to increase the pressure or decrease the pressure as desired with which the wheel 26 will press the wire against the wheel 25. Thus the wheel 26 acts to press the wire against wheel 25 and prevent relative slippage as it is fed through the feeding mechanism 15.

The feeding mechanism comprises a plurality of sets of feed rollers, in the present instance three sets of feed rollers. As best shown in FIG. 8, each set of feed rollers consists of a lower wire engaging roller 33 and a connected pinion 34 which are carried by a rotatably mounted shaft 35. These parts are cooperatively associated in the same manner as similar feed roller assemblies incorporated in the stripping mechanism 17, and as specifically shown in FIG. 7. The pinion 34 is shown as being in threaded engagement with the shaft 35, while an interlocking pin 36 interconnects the roller 33 and pinion 34, the roller being retained upon the end of shaft 35 by means of a retaining screw 37 and associated washer 38. As there shown, the shaft 35 is supported in a conventional bearing bracket 39 which supports suitable antifriction bearings 40. The bearing bracket 39 is supported upon the front wall 12 of the housing in any suitable manner, and the end of the shaft 35, which projects rearwardly of the wall 12, is provided with a pinion 41. This pinion is connectible, in a manner to subsequently be described in detail, with an idler pinion 42 having driving engagement with a gear 43 driven by a suitable electric motor 44, as shown in FIGS. 3 and 6.

As shown in FIGS. 2 and 8, the lower roller 33 of each set is operatively associated with an upper roller 45 which is connected to an associated pinion 46 and mounted for rotation upon a shaft 47 supported at the outermost end of an arm 48 which is supported for swinging movement upon a suitable pivot 49. The shaft 35 and shaft 37 are interconnected by a tension spring 50 which acts to retain the pinions 34 and 46 in meshed driving relationship, and the rollers 33 and 45 in engagement with the wire which is passed therebetween. The wire is guided through the feed rollers by a guide tube 51 which has cutout portions 52 for respectively permitting the feed rollers to engage the wire.

As will be seen by reference to FIGS. 2 and 8, the subsequent sets of feed rollers are driven from the right hand set by means of idler gears 53 which meshes in each case with the pinions 34 of adjacent sets of feed rollers.

In order to enable the wire to be initially fed while threading it through the subsequent cutting mechanism 16 and stripping mechanism 17, provision is made for manually actuating the feed rollers of the feeding mechanism 15. As shown primarily in FIGS. 1 and 2, the shaft 35 of the feeding mechanism which is connected with the pinion 41, has its opposite end extended and connected with a manually operable knob 54 which is conveniently accessible on the forward side of the apparatus for manual manipulation during the wire threading operation. Upon leaving the feeding mechanism, the wire is led from the end of tube 51 into the cutting mechanism, the details of construction of which will now be described.

*The cutting mechanism*

Referring now to FIGS. 4 and 8, the wire is conducted from the tube 51 of the feeding mechanism through a series of tubular bushings 55, which are supported in a stationary block 56 affixed to the front wall 12 by suitable mounting screws 57. The entrance end of the bushings 55 is rounded as shown at 57' so as not to damage the entering wire.

As shown primarily in FIG. 8, the bushings and block have vertical slots or passages in which a plurality of sets of cutting blades 58 are positioned. A blade 59 of each set is connected in a head member 60 by means of a pin 61 which passes through an aperture in each of the associated blades, this aperture being indicated by the numerals 62 of FIG. 5 showing the details of the blade construction. In a similar manner, a blade 63 of each set of cutting blades is secured into a lower head member 64 by means of a pin 65 which passes through apertures 66 in the blade ends.

As shown in FIG. 5, the two cutting blades of the central set are provided with end opening slots 67 which are respectively terminated at their innermost ends in a crescent shape cutting edge 68. These two blades comprise the cutters which sever the wire conductor. As a consequence, these blades are supported in the head members and are so arranged that when the head members are moved towards each other, the cutting edges pass each other so as to completely sever the wire.

The other two sets on each side of the centrally arranged set constitute the blades which sever the insulation only of the wire. These blades are similarly constructed to those just described for the central set of blades, except that in this case the crescent shaped cutting edge is provided centrally with a notched auxiliary cutting edge 69. These edges 69 are formed so that when the blades are closed sufficiently to cut the insulation, the conductor will extend through the notches 69 and will therefore remain unsevered, the insulation only being severed by these blades.

In the illustrated embodiment of the present invention, provision is made for actuating the cutter blades by electromagnetic means comprising an upper solenoid coil 70 which is operatively associated with a plunger 71 suspended from the outermost end of an arm 72 having a pivotal supporting pin 73 intermediate its ends. The arm 72 is biased in a clockwise direction by a spring 74 which acts to normally maintain the plunger 71 in a raised position, when the coil 70 is deenergized. This plunger is connected through a link 75 to the upper head member 60, a retaining pin 76 extending through an opening 77 in the lower end of the link 75. Thus, when the coil is deenergized, the blades 59 will be retained in raised noncutting position.

Similarly, a lower solenoid coil 78 is associated with a plunger 79. This plunger is biased in a downward direction by means of a coil spring 80 having one end anchored and its other end secured to a pin 81 supported in a pair of spaced lugs 82 at the lower end of the plunger. The upper end of the plunger 79 is connected through a link 83 with the lower head member 64, a pin 84 extending through an aperture or opening 85 in the upper end of the link 83. With this arrangement, the spring 80 thus acts to normally maintain the lower head member 64 and the blades 63 carried thereby in a lowered or noncutting position of the blades, when the associated coil 78 is in a deenergized condition.

Upon energization of the coils 70 and 78, the associated plungers 71 and 79 will be actuated towards each other, this movement carrying the blades into cutting position. Upon deenergization, the springs 74 and 80 will act to restore the blades to noncutting position.

The cutting blades should be actuated together, and in order that their movement may be synchronized, the upper head member 60 is mechanically interlocked with the lower head member 64 by a pair of crossed bars 86 and 87, as shown in FIG. 2, these crossed bars being pivotally supported intermediate their ends upon a common pivot pin 88 supported and projecting from the forward edge of the block 56. The upper ends of the crossed bars each have a slot and pin connection with the upper head member 60, while these lower ends of the crossed bars each have a slot and pin connection with the lower head member 64. The head members are thus interlocked for unitary movement.

Referring now to FIGS. 4 and 6, the rearward end of the arm 72 extends through an extension of the front wall 12 and is connected to a rod 89 which is supported in a vertical position for reciprocable movement on supporting posts 90 placed at spaced intervals and secured by appropriate means to the rear surface of the wall 12. When the coils 70 and 78 are deenergized, the rod 89 normally occupies a lowermost position as shown in FIG. 4, but when the coils are energized the rod is moved towards its upper positon as shown in FIG. 6. Intermediate its ends, the rod 89 carries a pair of abutments 91 and 92 which are adjustably affixed for varied spacing. These abutments are spaced apart and are adapted to engage a projection 93 of a pivoted arm 94 which is adapted to open and close the contacts of a switch mechanism 95. This switch mechanism has contacts which are in an energizing circuit of the control for the coils 70 and 78, and are so arranged that these coils will be deenergized just prior to the actual cutting operation. Thus, the cutting blades will be free to be restored to noncutting position at the conclusion of the cutting operation. This control will subsequently be explained in detail.

A primary feature of the cutting operation resides in provision of means for terminating the feeding and stripping operations so that the wire will in fact be severed during a period of non-movement.

Before explaining the mechanism by which this feature is accomplished, it should be pointed out that the first feed roller 33 of the stripping mechanism, as shown in FIG. 7, is driven through an idler gear 96 which is operatively associated with an idler pinion 97 in continuously meshed connection with a main driving gear 98 driven by a separate motor 99.

The idler pinions 42 and 97 are respectively carried by rocker arms 100 and 101 which are respectively mounted for swinging movements about the axis of rotation of gear 43 and gear 98, whereby their associated idlers 42 and 97 may be moved into and out of meshed engagement with the gears 41 and 96, respectively.

The rocker arm 100, as shown in FIG. 6, has a leg 102 which extends past the rod 89 into the line of movement of an abutment member 103 carried by the rod and being adapted to engage the under edge of the leg 102 and move it upwardly, when the rod is raised, so as to carry the idler pinion 42 out of engagement with the pinion 41 and thus disconnect driving power from the feeding mechanism, during the actual cutting operation. A spring 104 normally biases the rocker arm 100 in a direction to engage the idler pinion 42 with pinion 41 to establish a driving connection with the feeding mechanism, when the cutters are moved to noncutting position.

A pin 105 adjacent the outer end of the leg 102 extends below an adjacent leg 106 of the rocker arm 101 so as to simultaneously move it upwardly in a direction to disengage the idler pinion 97 from gear 96 so as to terminate the driving of the stripping mechanism during the actual cutting operation. In a similar manner, a spring 107 biases the rocker arm 101 in a direction to restore meshed relation between the idler pinion 97 and gear 96 and thus connect the driving power with the stripping mechanism after the cutting operation.

In order to further facilitate initial threading of the wire through the feeding mechanism by manual manipulation of the knob 54, as previously explained, and prevent overrunning of the feeding mechanism when stopping the apparatus, it is desirable that the idler pinions 42 and 97 shall be disengaged immediately from their associated pinions 41 upon deenergization of the driving power. This is accomplished by a mechanism which will now be described, and which operates to raise the legs 102 and 106 upwardly out of contact with abutment member 103, but which will operate to release these legs for normal operation during the ordinary cutting and stripping operation of the apparatus.

For the foregoing purpose, there is provided on the rear side of the wall 12 within the housing 10, a solenoid coil 108 which is operatively associated with a plunger 109, this plunger being normally biased to a raised position by means of a spring 110. As shown in FIG. 4, the pin 105 projects rearwardly of the leg 102 so that its rear end is in the line of movement of a part of the plunger 109. Thus, in the upward position of the plunger 109, the legs 102 and 106 will be elevated with respect to the abutment member 103 so as to move the idler pinions 42 and 97 out of driving engagement with the pinion 41 and gear 96. However, upon energization of the coil 108 by control which will subsequently be described, so that it will be energized during normal operation of the machine, the plunger will be pulled downwardly against the action of spring 110 and thus release the legs 102 and 106 for movement back to a position wherein they are cooperatively associated with the abutment member 103 for normal operation during cutting of the wire.

The stripping mechanism

The stripping mechanism comprises a plurality of sets of rollers which are mounted in a similar manner to the rollers of the feeding mechanism. The stripping mechanism does differ from the feeding mechanism, however, in that instead of driving the sets subsequent to the first set of rollers through idler gears 53, provision is made for driving the subsequent sets of rollers through a slip clutch arrangement which will now be described.

As shown in FIG. 6, the gear 96 continually meshes with a pinion 110 of such ratio that it may drive an associated shaft 111 at double the speed with which the shaft 35 is driven through the pinion 41.

The shaft 111 is supported in antifriction bearings, FIG. 7, in the same manner as shaft 35, and is held against endwise movement by means of a retaining collar 112 which is secured to the shaft by means of a pin 113.

The pinion 110 is rotatably supported upon a contracted end portion 114 of the shaft 111 with a friction disc 115 of fibre or other suitable material positioned on each side thereof. By means of an adjustable nut 116 in threaded engagement with the outer end of the contracted shaft portion 114, a spring washer 117 may be forced against an associated washer 118 interposed between it and the adjacent friction disc 115. It is believed that it will be apparent that by adjusting the nut 116, a slip driving connection will be obtained between the pinion 110 and the shaft 111.

A stripping operation, by means of the stripping mechanism just described, will now be explained. Let it be assumed that the cutters operate in a normal manner to provide a desired length of wire section with severed insulation sections respectively on the leading and following ends, which are to be removed by the stripping mechanism.

The feed rollers and the first set of stripping rollers will all operate at the same speed to feed the wire section in a direction to bring its leading end to the second set of stripping rollers. The drive of the second and third stripping rollers being through the friction clutch, these rollers will be free at this time to operate at their increased speed. Therefore, when the leading and insulation section passes under the second set of rollers, the wire section will be held at the lower feeding speed while the second set of stripping rollers operating at the higher speed will quickly move the insulation section ahead, thus stripping it from the associated conductor end.

Now, as the body of the wire section is passing under both the first and second sets of stripping rollers they will operate at the lower feeding speed. Therefore, when the following end of the wire section reaches a position in which the insulation section passes under the first set of stripping rollers, the second set of stripping rollers will be free to operate at their higher speed and move the wire body and following conductor end quickly ahead, thus stripping the following end insulating section from the associated conductor end.

The stripped insulation sections are carried forwardly through the tube 51 associated with the stripping rollers and are discharged upon reaching the tube end.

The master tape cycle control mechanism

Referring now to FIGS. 9 and 10, the measuring wheel 25 of the pressure applying device is shown as being carried upon a shaft 119 which is supported upon a section of the front wall 12 by means of a suitable antifriction bearing assembly 120. The end of the shaft 119, which is positioned within the housing 10, is provided with a driving disc 121, this disc being slidably supported upon a reduced shaft section 122 and biased towards the end of the shaft section by means of an expansion coil spring 123. Adjacent the driving disc 121, a rearwardly projecting post 124 is secured to the wall section by means of a mounting screw 125. The opposite or projecting end of this post carries a rotatably mounted pulley 126, this pulley being mounted upon a conventional antifriction bearing assembly 127.

The driving disc 121 and the pulley 126 are cooperatively associated with an idler roller 128 adapted at diametrically opposite sides to frictionally engage the confronting faces of the driving disc 121 and pulley 126 so as to form a friction drive therebetween which may be adjusted to vary the speed at which the pulley 126 will be actuated. The idler roller 128 is rotatably mounted at one end of a rack member 129 which is supported for endwise movement in the post 124. The teeth of the rack 129 mesh with the teeth at one end of a rotatably mounted counter shaft 130, the counter shaft having teeth at its other end which mesh with the teeth at an associated end of a shaft assembly 131. The shaft assembly 131 extends upwardly through the top of the housing 10 and is connected with a dial knob 132 mounted in a suitable support for rotational movement. The dial knob, as shown in FIG. 1, carries graduations which are cooperatively associated with vernier graduations carried by a sector plate 133 supported at the edge of the dial knob. The function of the dialing arrangement just described will be more fully explained in connection with the description of the length control by which the lengths of wire or filamentary sections to be cut is determined.

As shown in FIG. 10, a second pulley 134 is rotatably mounted upon a post 135, this post being slidably connected with the front wall 12 by a screw member 136 having a shank portion which is slidable longitudinally of a slot 137. The pulleys 126 and 134 are interconnected by means of a band or tape 138 of suitable material. The tension applied to the tape 138 may be readily changed, and different lengths of tape accommodated, by adjusting the position of the post 135 along the slot 137. Finer adjustments are accomplished by means of a screw 139 having its threaded end in threaded engagement with the post 135, and its head end rotatably supported in a post 140 which is also slidably supported for adjustable movement with respect to the slot 137 by means of a screw 141.

The utilization of a variable friction drive for actuating the pulleys 126 and 134 with the tape 138 thereon provides an arrangement having a high degree of flexibility permitting a wide range of speed variation in the drive of the tape. While such a drive has been illustrated in the present instance, it will be appreciated that the pulley 126 might be driven through a gear transmission, and that the speed could in such case be changed by the use of gears of different ratios.

As shown in FIG. 10, the tape 138 is provided with marginal edge notches 142. The opposite edges of the tape 138 are associated with sets of control switches, one set of switches being designated generally at A and comprising the switches 143 and 144, each of which has an actuator arm 145 bearing against the associated edge of the tape.

In a similar manner, there are provided on the opposite side of the tape a pair of switches 146 and 147 which constitute a set designated at B. Each of these switches has an actuating arm 148 arranged to bear against the associated edge of the tape 138. These switches have contacts which are normally maintained in opened position, when the switch arms are in engagement with the normal edge of the tape 138. However, upon a notch 142 reaching one of the arms, the arm is permitted to move to a position which closes the contacts of the switch with which it is associated. The switches associated with the tape 138 constitute the primary control for determining the actuation of the cutting mechanism. The tails of this control will subsequently be described more specifically.

*The cutting length control*

Provision is made for selectively utilizing the switches of set A or the set B, depending upon the length of filamentary material to be cut. In each case, the actuation of the switch 143 or 146 determines the cutting operation, so that it will be readily apparent that the interval between these operations will determine the cutting length. Moreover, it will be appreciated that the interval of cutting will depend upon the spacing the notches 142 along the tape, and also the speed of movement of the tape.

In the arrangement described, it is proposed to utilize a spacing on one side of the tape, for example a spacing of notches which are cooperative with the switches 143 and 144, such that a 1:1 ratio is obtained in which the tape is moving at the same speed as the filamentary material and a three inch length will be cut when the dial knob 132 is set at zero. If desired, the notches in the tape which are associated with the switches 146 and 147 may be of greater spacing. While the ratio between the notch spacing on the one side with respect to that on the other side may be of any desired value, at the present instance the notch spacing on the side associated with the switches 146 and 147 has been utilized which is six times greater than the spacing on the side associated with the switches 143 and 144. Thus, if control is shifted to set B, wires of eighteen inches in length would be cut instead of three inches.

In addition then to being able to vary the cut wire lengths by a ratio depending upon the relationship of the notch spacing on one side of the tape with respect to the notch spacing on the other side of the tape, additional ratios may be obtained by actuation of the dial knob 132 to move the idler roller 128 towards or away from the axis of rotation of the driving disc 121.

The dial knob 132 is graduated from zero to 100, and by utilizing standard graduations, it is possible to calibrate the dial so that the particular cutting length for each graduation will be determined, and it will then only be necessary to set the dial to this graduation to get a specific desired length. For example, the dial graduations may indicate a three inch wire length for a zero dial setting, a seven inch wire length for a setting of the dial at 50, etc.

By utilizing a master tape 138 in which the notches 142 are uniformly spaced, cyclic operation will be obtained, wherein for a given setting of the dial 132, a plurality of filamentary lengths of the same length will but cut. However, it will be appreciated that by utilizing a master tape in which the notches are placed at proper varied intervals, each complete movement of the tape may be utilized to cut a predetermined series of lengths of different length, or a predetermined number of one length and a different number of another length. The utilization of a master control tape such as described lends itself to a high degree of flexibility and to different cyclic operations, as desired.

*The batch control*

Utilization of an electro-magnetically actuated cutting mechanism as previously described permits using an electro-magnetic type of batch control as previously identified by the numeral 20. Briefly, the batch control comprises suitable mechanism which may be adjusted by means of a suitable dial knob 149 and associated vernier section 150, as shown in FIGS. 1, 2 and 3. The mechanism is arranged to be actuated simultaneously with each cutting operation, and is connected into the control circuit in a manner to be hereinafter explained, so that upon a predetermined number of operations, as determined by the dial setting, the controller will open normally closed contacts 151 which are connected in a stopping or deenergizing circuit of the apparatus.

*The electrical control in general*

Referring now to FIG. 11, a main circuit 152 is connected with an electrical source through a double-pole main line switch 153. With the main switch 153 in closed position, the main circuit is fed through a line contactor 154 having an energizing coil 155 and normally opened contacts 156 and 157. The coil 155 is energizable through a circuit as follows: from one side of the main circuit 152, a head of contacts 156, through a conductor 158, the contacts of a start switch 159, a conductor 160 to one side of the coil, from the other side of the coil through a conductor 161, the normally closed contacts of a stop switch 162, contacts 151 of the batch counter, and thence back to the other side of the main circuit, ahead of contacts 157. Closure of the contacts of start switch 159, energizes the coil 155 causing contactor 154 to operate and close contacts 156 and 157 so as to energize the main circuit 152. The contactor is retained in closed position by a holding circuit through a conductor 163 which forms a shunting connection around the start switch and is connected with the same side of the main circuit as conductor 158, except on the opposite side of contacts 156. Energization of the main circuit starts the motors 44 and 99. Opening of the contacts of stop switch 162 or contacts of 151 of the batch counter will open the energizing circuit of coil 155 and cause the contactor 154 to be deenergized, whereupon opening of its contacts deenergizes the main circuit 152.

As previously explained, the plunger 109 normally maintains the legs 102 and 106 in raised position to aid threading of the filamentary material and prevent overrunning of the feeding mechanism when shutting down the apparatus. However, upon the main circuit 152 being energized, the solenoid coil 108, which is connected across the main circuit, will act to pull down the plunger 109, and thus release the legs 102 and 106 for action under their respective springs to connect the feed rollers and stripping rollers with their driving motors 44 and 99 respectively. Operation of these rollers will continue to feed the filamentary material, but no cutting operations will take place until a pre-set relay 164 is first energized. This relay has an operating coil 165 and normally opened contacts 166 and 167.

The cutting operations are initiated by closing the contacts of a set switch 168 which energizes the coil 165 through the following circuit: from one side of the main circuit 152 through conductor 169 to one side of coil 165, from the other side of the coil through conductor 170, the contacts of said switch 168, to conductor 171, conductor 160, and thence through conductor 163 to the other side of the main circuit 152.

Operation of the pre-set relay 164, causes it to close its contacts, contacts 166 operating to connect the live conductor 169 with one side of the batch counter 20, the total counter 20', and the solenoid coils 70 and 78. The contacts 167 connect the other terminal of the coil 165 through a holding circuit consisting of conductor 172, contacts 167, thence through the contacts of switch 95, and conductor 173 back to the other side of the main circuit 152. The other terminals of the batch counter, total counter, and solenoid coils 70 and 78 are connected through a conductor 174 to branch parallel circuits containing switches 143 and 146, and which are connected by conductors 175 and 176 to the terminals of a double-throw switch 177 which may be selectively actuated to connect either of the conductors 175 or 176 with conductor 171, and thence through conductors 160 and 163 to the other side of the main circuit.

Selective actuation of the switch 177 determines the ratio of the cutting intervals, that is, whether the cutting interval will be determined by closing the contacts of switch 143, or switch 146, as previously explained in connection with the master tape cycle control mechanism description. As will be noted, the switches 144 and 147 are respectively associated with switches 143 and 146. The switches 144 and 147 are selectively operable, depending upon the position of switch 177, to provide shunting control connections around the manually operable set switch 168, for a purpose to be explained subsequently.

Upon closure of switch 143 or switch 146 by the passage of an associated notch 142 in the tape 138, the solenoid coils 70 and 78 will be energized to produce a cutting operation. As a result of this cutting operation, the rod 89 moves upwardly and opens the contacts of switch 95 just prior to completion of the cutting operation, so that the holding circuit of the pre-set relay operating coil 165 will be opened, thus permitting this relay to drop out and open its contacts. As soon as contacts 166 open, they deenergize the circuit to the batch counter, total counter, and the solenoid coils 70 and 78. Simultaneously, the action of rod 89 raises arms 102 and 106 so as to disconnect the feeding and stripping rollers from their respective driving motors and terminate movement of the material during the cutting operation.

Now, when the notch which has caused the switch 143 or 146 to operate reaches either the switch 144 or 147, the connected switch will be closed and thus act to energize the coil 165 of the pre-set relay through the following circuit: from the live conductor 171, through conductor 175 and switch 144 or conductor 176 and switch 147 depending upon the position of switch 177, and thence through conductor 178, conductor 170 to one side of coil 165, from the other side of the coil through conductor 169 to the other side of the main circuit 152. Thus, the actuating mechanism for the cutting operation will be preset after the switch controlling the cutting operation is closed by the operation of the tape 138.

The cutting operations will continue, each cutting operation being registered on the batch counter, and when the number of operations have been completed as determined by the setting of the batch counter, this counter will operate to open its contacts 151 and interrupt the holding circuit of coil 155 of the line contactor 154 which will then open and deenergize the main circuit 152 so as to shut down the apparatus until it is desired to start the next cycle of operations or the cutting of the next batch of filamentary material.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Timed sequence switch control apparatus, comprising: a rotatable driving member; a rotatable driven member, said members having spaced parallel axes of rotation and spaced confronting overlapping radial surfaces; a rotatably mounted element positioned between said axes of rotation and having diametrically opposite sides respectively in engagement with said surfaces; a plurality of switch contacts; means moved by said driven member having parts for cyclically actuating said contacts in timed relation to the speed of said driving member; and rotary linear motion transmitting means for adjustably varying the position of said element between said shafts to vary the speed ratio between said members and the consequent time interval of the actuation of said contacts.

2. Timed sequence switch control apparatus for successively actuating a plurality of contacts at predetermined time intervals, said apparatus comprising: a first rotatably mounted disc adapted to be driven at a constant speed; a second rotatably mounted disc, said disc being mounted with their rotational axes in parallel relation and having facing surfaces in overlapping relation; a rotatably mounted idler element supported for shifting movement between said discs, said element having diametrically opposite sides respectively engaging said facing surfaces; a member connected for movement with said second disc having a notched marginal edge portion; switch means having contacts operable by an actuator successively movable by said notched portions; and manually operable means for adjusting the position of said idler between said discs so as to vary the speed of movement of said member and the consequent timing interval of actuation of said contacts.

References Cited in the file of this patent

UNITED STATES PATENTS

| | | |
|---|---|---|
| 1,165,353 | Woodworth | Dec. 21, 1915 |
| 1,488,512 | Outrey | Apr. 1, 1924 |
| 1,814,165 | Jacobsen | July 14, 1931 |
| 1,821,775 | Tittle | Sept. 1, 1931 |
| 2,800,539 | Edminster | July 23, 1957 |
| 2,824,182 | Lambert | Feb. 18, 1958 |

UNITED STATES PATENT OFFICE
CERTIFICATE OF CORRECTION

Patent No. 3,020,364            February 6, 1962

Floyd G. Eubanks

It is hereby certified that error appears in the above numbered patent requiring correction and that the said Letters Patent should read as corrected below.

In the grant, lines 2 and 12, and in the heading to the printed specification, line 4, name of assignee, for "Robert M. McManigol", each occurrence, read -- Robert M. McManigal --.

Signed and sealed this 5th day of June 1962.

(SEAL)
Attest:

ERNEST W. SWIDER
Attesting Officer

DAVID L. LADD
Commissioner of Patents